(12) United States Patent
Jeon et al.

(10) Patent No.: US 8,686,671 B2
(45) Date of Patent: Apr. 1, 2014

(54) METHOD FOR COMPENSATING NONLINEARITY OF RESOLVER FOR HYBRID AND FUEL CELL VEHICLES

(75) Inventors: Woo Yong Jeon, Seoul (KR); Shin Hye Chun, Gyeonggi-do (KR); Won Kyoung Choi, Gyeonggi-do (KR); Bum Sik Kim, Gyeonggi-do (KR); Young Kook Lee, Seoul (KR); Jin Hwan Jung, Gyeonngi-do (KR); Sang Hyeon Moon, Gyeonggi-do (KR); Sung Kyu Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 769 days.

(21) Appl. No.: 12/853,456

(22) Filed: Aug. 10, 2010

(65) Prior Publication Data

US 2011/0260663 A1 Oct. 27, 2011

(30) Foreign Application Priority Data

Apr. 22, 2010 (KR) ........................ 10-2010-0037148

(51) Int. Cl.
*H02P 6/00* (2006.01)
(52) U.S. Cl.
USPC ................... 318/400.01; 318/400.04; 318/700
(58) Field of Classification Search
USPC ............................... 318/400.01, 400.04, 700
See application file for complete search history.

(56) References Cited

U.S. PATENT DOCUMENTS

| | | | | |
|---|---|---|---|---|
| 6,894,454 | B2 * | 5/2005 | Patel et al. | 318/700 |
| 2006/0138977 | A1 * | 6/2006 | Kircanski et al. | 318/135 |
| 2007/0229017 | A1 * | 10/2007 | Takaishi | 318/632 |
| 2008/0129242 | A1 * | 6/2008 | Liu et al. | 318/605 |
| 2010/0301789 | A1 * | 12/2010 | Pollock et al. | 318/400.23 |

FOREIGN PATENT DOCUMENTS

| | | |
|---|---|---|
| JP | 2002-078374 A | 3/2002 |
| JP | 2004-266935 A | 9/2004 |
| KR | 10-0176469 | 11/1998 |
| KR | 10-2008-0102127 | 11/2008 |

\* cited by examiner

*Primary Examiner* — Kawing Chan
(74) *Attorney, Agent, or Firm* — Edwards Wildman Palmer LLP; Peter F. Corless

(57) ABSTRACT

The present invention provides a method for compensating nonlinearity of a resolver to control a motor in hybrid and fuel cell vehicles, thereby stably controlling the motor current during high-torque and high-speed operation. In preferred aspects, the present invention provides a method for compensating nonlinearity of a resolver to control a motor in hybrid and fuel cell vehicles, the method including collecting resolver position data; determining whether to perform resolver position correction in the corresponding vehicle; and compensating nonlinearity of the resolver based on the collected resolver position data, if it is determined that the resolver position correction is not performed.

4 Claims, 5 Drawing Sheets

| | |
|---|---|
| $X_N$ | Reference input value of compensation table |
| $Y_N$ | Reference output value of compensation table |
| $X_i$ | Resolver position (before correction) |
| $Y_o$ | Resolver position (after correction) |

[ "Prior Art" ]

METHOD FOR COMPENSATING NONLINEARITY OF RESOLVER FOR HYBRID AND FUEL CELL VEHICLES

CROSS-REFERENCE TO RELATED APPLICATION

This application claims under 35 U.S.C. §119(a) the benefit of Korean Patent Application No. 10-2010-0037148 filed Apr. 22, 2010, the entire contents of which are incorporated herein by reference.

BACKGROUND (a) Technical Field

The present disclosure relates in general to a method for compensating the nonlinearity of a resolver for hybrid and fuel cell vehicles. More particularly, it relates to a method for compensating the nonlinearity of a resolver to control a motor in hybrid and fuel cell vehicles, thereby stably controlling the motor current during high-torque and high-speed operation.

(b) Background Art

A hybrid vehicle using an engine and a drive motor is a vehicle which is driven by the drive motor during initial start-up and then driven both by the power of the engine and the power of the motor when the vehicle is moving above a predetermined speed, thus improving fuel efficiency and reducing exhaust gas.

A fuel cell vehicle is a vehicle equipped with a fuel cell stack, in which hydrogen supplied to the fuel cell stack is dissociated into hydrogen ions and electrons by a catalyst of a fuel electrode (anode), wherein the hydrogen ions are transmitted to an air electrode (cathode) through an electrolyte membrane, and oxygen supplied to the air electrode reacts with the electrons transmitted to the air electrode through an external conducting wire to produce water and electricity, thereby operating a drive motor.

Hybrid and fuel cell vehicles both employ a motor for driving the vehicle and an inverter system for driving the motor.

In particular, a resolver for detecting the speed of the motor and the angle of a rotor is employed in hybrid and fuel cell vehicles, where the detection and the failure detection by the resolver is regarded as one of the most important factors in motor control.

A configuration of the inverter system used in hybrid and fuel cell vehicles is described briefly with reference to FIG. 1.

A battery 10 is connected to an inverter 30 by a main relay 20, the inverter 30 is electrically connected to a motor 40 (e.g., permanent magnet synchronous motor), and the motor 40 is equipped with a resolver 50, which is a type of rotation angle detection sensor for detecting the absolute position of a rotor and transmitting the detection signal to the inverter 30.

The inverter 30 preferably includes a power module 31 (e.g., IGBT), which transmits electrical energy between the battery 10 and the permanent magnet synchronous motor 40, a DC link capacitor 32, which absorbs the ripple component of DC voltage caused by the operation of the inverter 30 to prevent the ripple component from being transmitted to the battery 10, a DC link voltage sensor 33, which measures the DC voltage of the inverter 30, i.e., the voltage at both ends of the DC link capacitor 32, to be used to control the inverter 30, a DC link voltage sensing circuit 34, which processes the output of the DC link voltage sensor 33 to have a magnitude capable of being input to an AD converter and, at the same time, prevents the occurrence of a voltage measurement error due to noise, etc., a current sensor 35, which measures the alternating current of the inverter 30 to be used to control the inverter 30, a current sensing circuit 36, which processes the output of a current sensor in a current sensor module to have a magnitude capable of being input to the AD converter and, at the same time, prevents the occurrence of a current measurement error due to noise, etc., a CPU 37, which is equipped with a software for controlling the inverter 30 and controls the overall operation of the inverter 30 using measured physical parameters, and a control/gate board 38 equipped with the above-described circuits and components used to control the inverter 30.

Preferably, the resolver 50 is used as a position sensor for detecting an accurate position of the motor rotor to accurately control the motor 40 by means of the inverter 30.

Accordingly, when the accurate position of the motor rotor is not suitably detected, it is difficult to satisfy a driver's demand torque and the controllability of the motor may be lost. Therefore, it is necessary to establish a coordinate system for the vector control of the motor in synchronization with rotor flux position and, for this purpose, it is necessary to read the absolute position of the motor rotor. Accordingly, the resolver is used to detect the absolute position of the rotor (i.e., rotation angle of the rotor).

Preferably, the resolver is generally composed of two elements. That is, the resolver is preferably composed of a rotor and a stator, like the motor. The rotor of the resolver is attached to the rotor of the motor, and the stator of the resolver is attached to the stator of the motor.

Therefore, the resolver rotates by receiving an excitation signal of 10 KHz generated from a resolver-to-digital converter (RDC) of the inverter to deliver a sine wave and a cosine wave to the RDC, demodulates the excitation signal component (10 kHz) from the sine wave and the cosine wave, and detects the position of the motor rotor.

Accordingly, each phase of the rotor is accurately measured by the resolver, and the RDC including a synchronous rectifier for rectifying the measurement value and a voltage control oscillator (VCO) for outputting the rectified voltage at a desired oscillation frequency transmits the measured phase of the rotor. Therefore, it is possible to accurately control the motor speed and the motor torque required for the vehicle operation.

As shown in FIG. 2, the ideal position information of the motor rotor should have linearity. However, the position information of the motor rotor detected by the resolver has nonlinearity which is out of the ideal position information. It is believed that the nonlinearity is may be caused by the hardware characteristics of the resolver itself, while there is a difference in degree.

In the event of an error in the resolver due to the nonlinearity, the hybrid function may not work due to an error in the inverter during maximum torque/power operation at low speed and high speed, the stability of the current control may be reduced during high-torque and high-speed operation of the motor, and an increase in ripple (loss) may be caused by an increase in asymmetry of the motor phase current.

In other words, when an error occurs in the position information of the motor rotor due to the nonlinearity of the resolver, the control of the motor current by the inverter may become unstable during maximum torque operation at low speed. Further, when measuring the speed used in a motor control algorithm, it is impossible to measure an accurate speed, which may make the control of the motor current unstable during maximum power operation at high speed.

Accordingly, there is a need in the art for methods for compensating the nonlinearity of a resolver to control a motor in hybrid and fuel cell vehicles.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides methods for compensating nonlinearity of a resolver to control a motor in hybrid and fuel cell vehicles, which outputs position information of a resolver rotor to a resolver-to-digital converter (RDC) to extract position information data of the resolver rotor while a motor is driven at a constant low speed and to calculate a theoretical value of a position change and, when the extracted angular velocity of the resolver at an inflection point and the calculated theoretical angular velocity are the same, stores them as an input and an output of a compensation table such that the nonlinearity of the resolver is linearly compensated by a compensation function of the compensation table, thereby suitably stably controlling the motor current during high-torque and high-speed operation.

In a preferred embodiment, the present invention provides a method for compensating nonlinearity of a resolver to suitably control a motor in hybrid and fuel cell vehicles, the method preferably including collecting resolver position data by suitably calculating an actual resolver position change $\Delta\theta_n$ during one sampling period 1T, by calculating a theoretical value of a resolver position $\theta$ obtained by adding a theoretical value of a resolver position change $\Delta\theta_0$ to the previous theoretical value of the resolver position $\theta_{old}$, and by extracting the actual resolver position change $\Delta\theta_n$ at an inflection point of nonlinear period and the theoretical value of the resolver position change $\Delta\theta_0$; determining whether to perform resolver position correction in the corresponding vehicle; and compensating nonlinearity of the resolver based on the collected resolver position data, if it is determined that the resolver position correction is not suitably performed.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
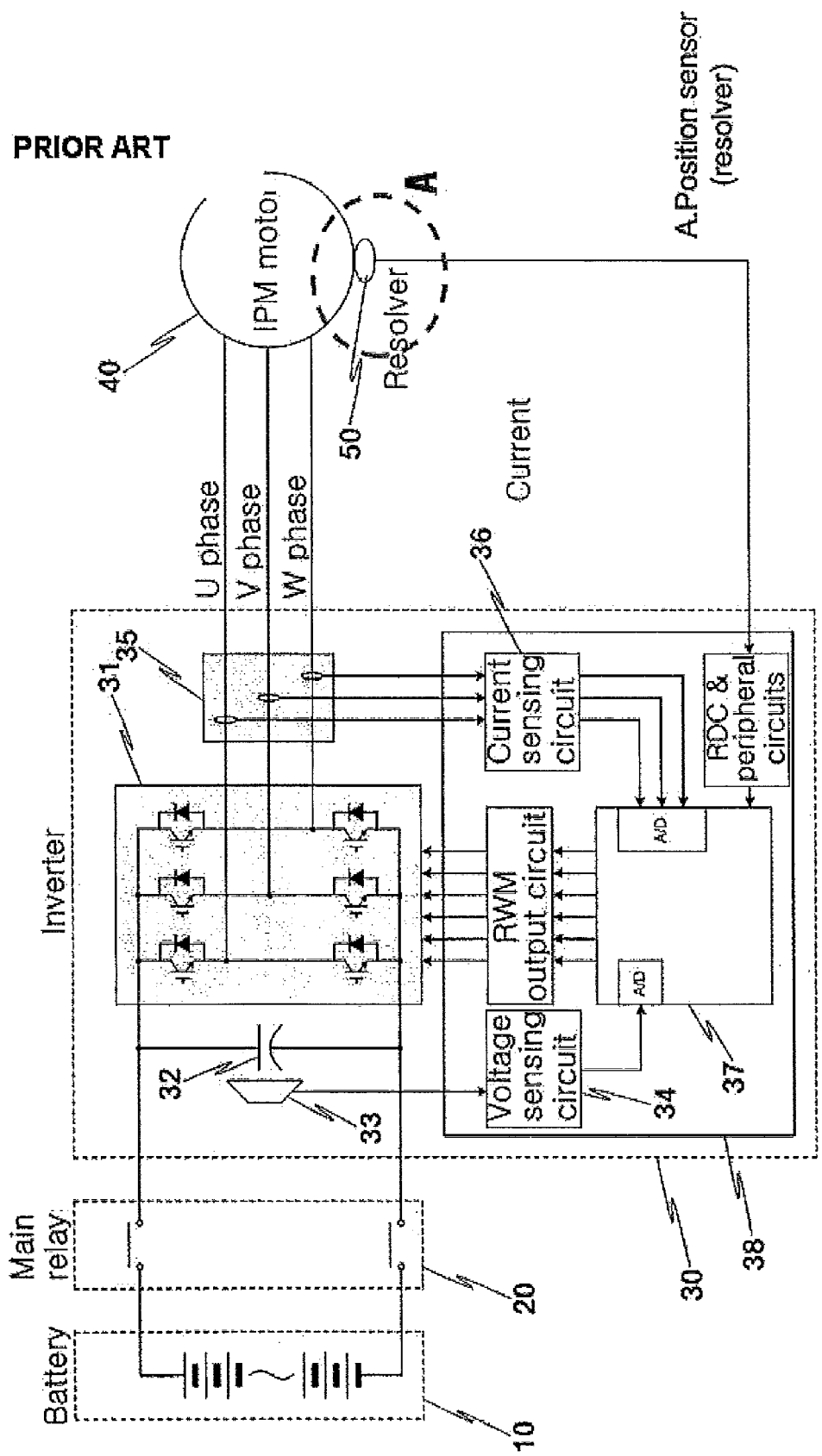
FIG. 1 is a schematic diagram showing a configuration of an inverter system in hybrid and fuel cell vehicles.
Figure 2:
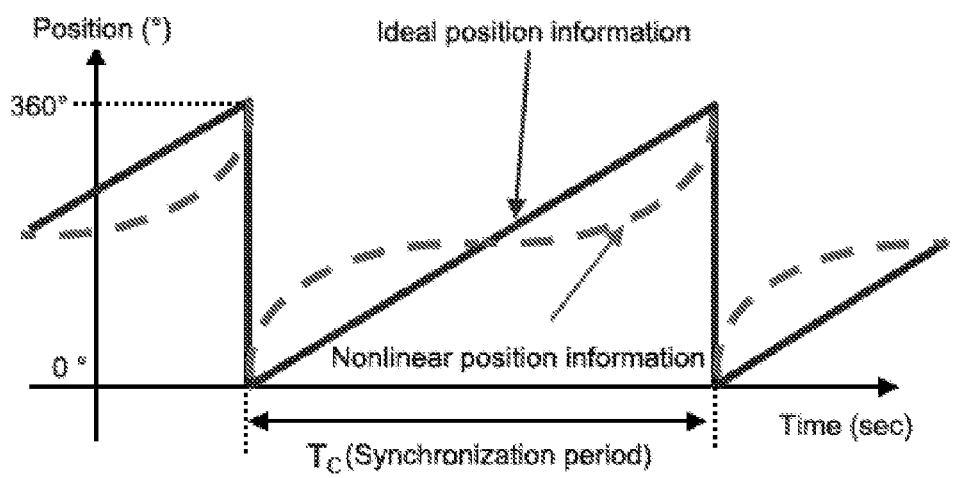
FIG. 2 is a graph illustrating a nonlinear phenomenon of a resolver for hybrid and fuel cell vehicles.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention features a method for compensating nonlinearity of a resolver to control a motor in hybrid and fuel cell vehicles, the method comprising collecting resolver position data, determining whether to perform resolver position correction in the corresponding vehicle, and compensating nonlinearity of the resolver based on the collected resolver position data, if it is determined that the resolver position correction is not performed.

In one embodiment, the resolver position data is collected by calculating an actual resolver position change $\Delta\theta_n$ during one sampling period 1T, by calculating a theoretical value of a resolver position $\theta$ obtained by adding a theoretical value of a resolver position change $\Delta\theta_0$ to the previous theoretical value of the resolver position $\theta_{old}$, and by extracting the actual resolver position change $\Delta\theta_n$ at an inflection point of nonlinear period and the theoretical value of the resolver position change $\Delta\theta_0$.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
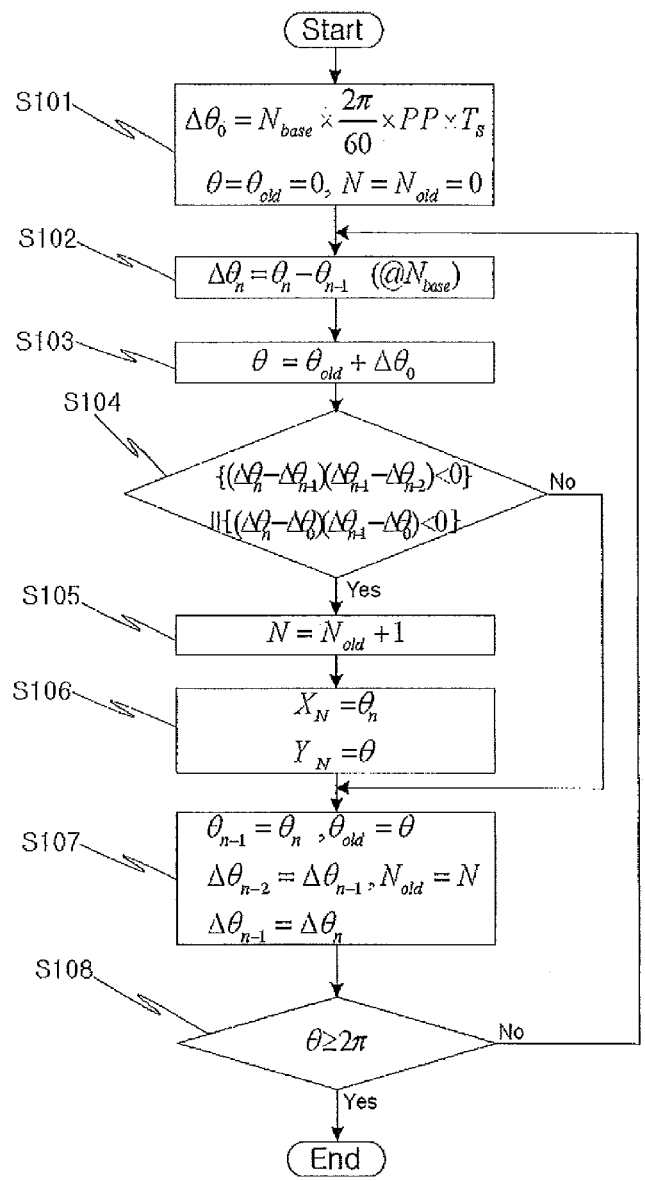
FIGS. 3 to 5 are flowcharts illustrating a method for compensating nonlinearity of a resolver to control a motor in hybrid and fuel cell vehicles according to preferred embodiments of the present invention.
Figure 4:
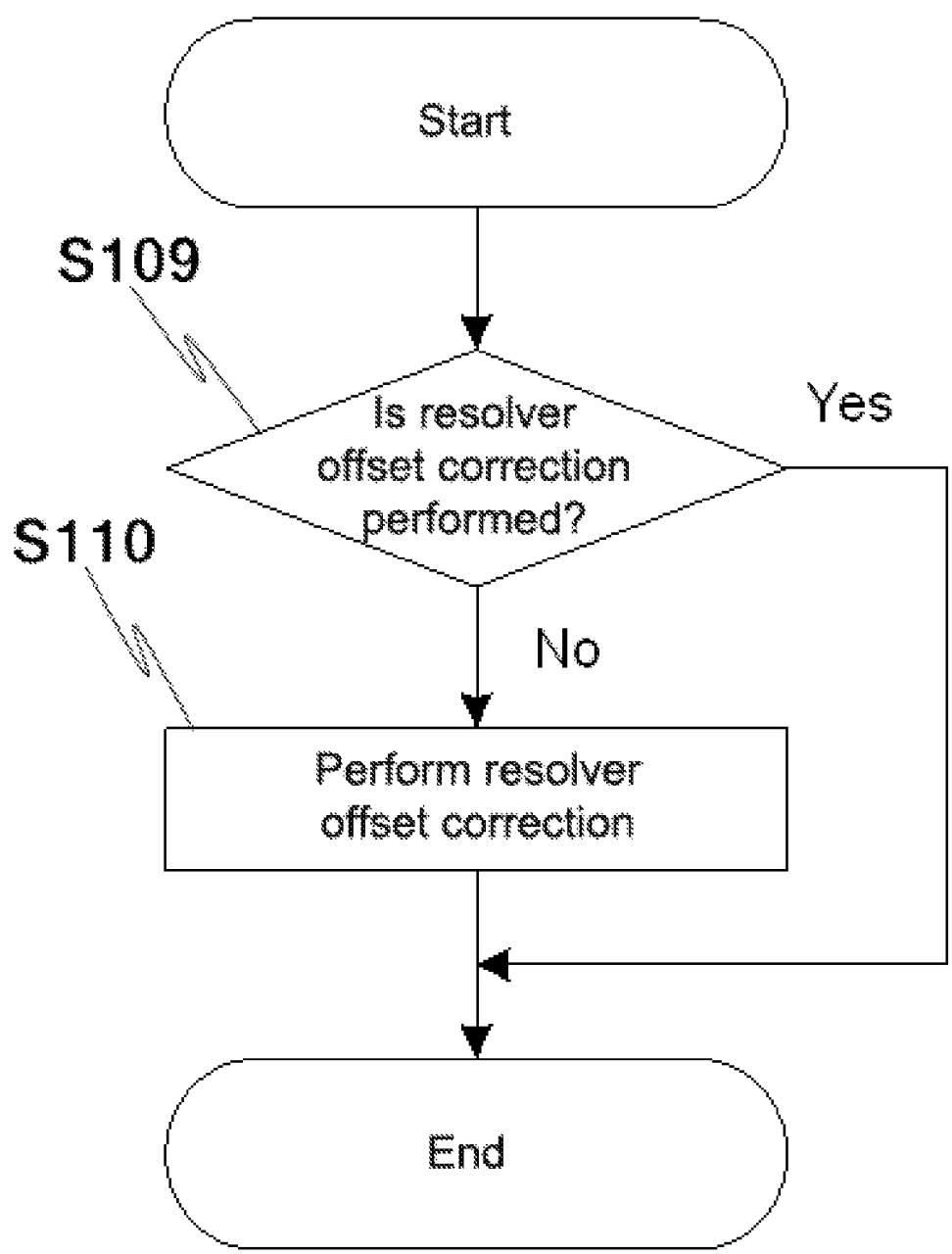
Figure 5:
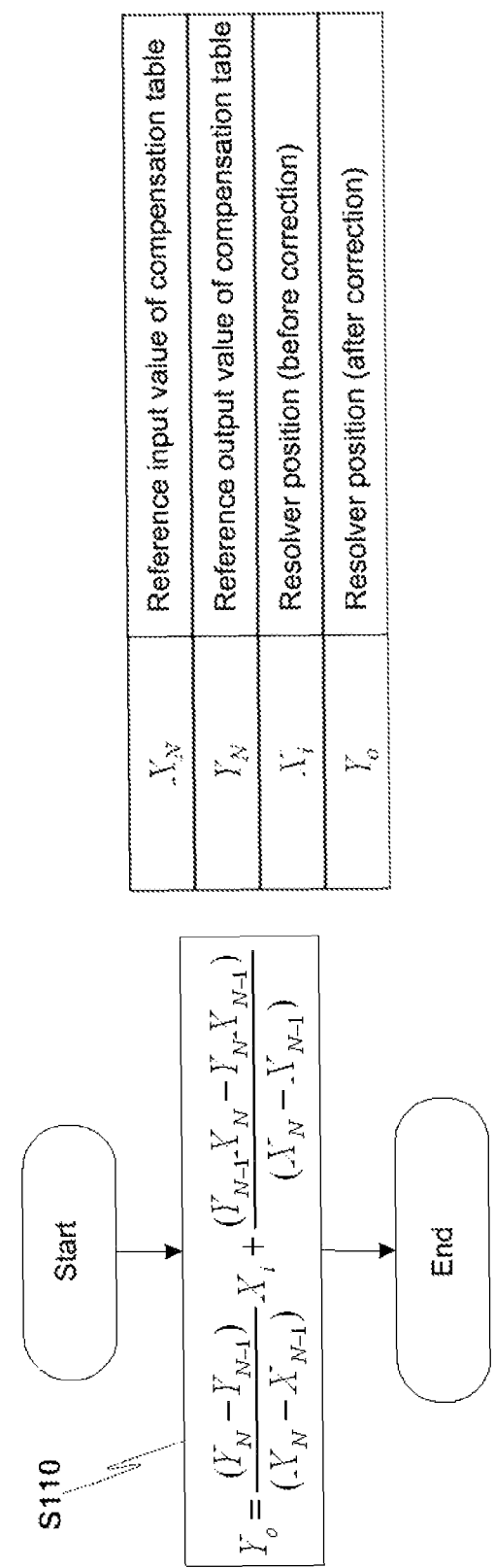

According to preferred embodiments of the present invention, and as shown in FIGS. 3 to 5, for example, FIGS. 3 to 5 are flowcharts illustrating a method for compensating nonlinearity of a resolver to control a motor in hybrid and fuel cell vehicles according to the present invention. In certain exemplary embodiments, for example as shown in FIG. 3, FIG. 3 illustrates a process of collecting resolver position data during resolver offset correction and a process of correcting the resolver position data. In other exemplary embodiments, for example as shown in FIG. 4, FIG. 4 illustrates a resolver offset correction determination logic. In still other exemplary embodiments, for example as shown in FIG. 5, FIG. 5 illustrates a process of correcting the resolver position data.

A data collection process for compensating the nonlinearity of the resolver is described with reference to FIG. 3 below.

In a first exemplary embodiment, a theoretical value of a resolver position change is initialized (S101).

Preferably, the theoretical value of the resolver position θ and the previous theoretical value of the resolver position $\theta_{old}$ are initialized to zero (0) and the integer N of the base speed $N_{base}$ and the previous integer $N_{old}$ are initialized such that the theoretical value of the resolver position change $\Delta\theta_0$ is initialized as represented by the following formula 1:

$$\Delta\theta_0 = N_{base} \times \frac{2\pi}{60} \times PP \times T_S \quad \text{[Formula 1]}$$

wherein $T_s$ represents the sampling period, PP represents the number of pole pairs of the motor, $N_{base}$ represents the base speed of the motor, and N represents the integer.

Next, when the motor is driven at a constant low speed, the resolver rotor is rotated, and thus the resolver outputs the position information of the motor rotator to the RDC. Preferably, according to further preferred embodiments, an increase in the actual resolver position change $\Delta\theta_n$ during one sampling period 1T is calculated by the following formula 2 (S102).

$$\Delta\theta_n = \theta_n - \theta_{n-1}(@N_{base}) \quad \text{[Formula 2]}$$

As can be seen from the above formula 2, while the motor is driven at the base speed $N_{base}$, i.e., at a constant low speed, the actual resolver position change $\Delta\theta_n$ during one sampling period 1T is suitably calculated by subtracting the previous resolver position $\theta_{n-1}$ from the current resolver position $\theta_n$.

Subsequently, the theoretical value of the resolver position θ is suitably calculated by adding the increase in the theoretical value of the resolver position change $\Delta\theta_0$ (S103).

$$\theta = \theta_{old} + \Delta\theta_0 \quad \text{[Formula 3]}$$

As can be seen from the above formula 3, the theoretical value of the resolver position θ is calculated by adding the theoretical value of the resolver position change $\Delta\theta_0$ to the previous theoretical value of the resolver position $\theta_{old}$.

Further, the position change of the resolver at the inflection point of the angular velocity is extracted and, at the same time, the position change at the theoretical value of the resolver position change is extracted (S104).

Accordingly, since the position information of the motor rotor detected by the resolver is shown as a nonlinear period, the actual resolver position change $\Delta\theta_n$ at the inflection point of the nonlinear period is extracted and, at the same time, the theoretical value of the resolver position change $\Delta\theta_0$ is extracted.

According to preferred exemplary embodiments of the present invention as described herein, and as can be seen from the formula indicated by S104 of FIG. 3, the value $[(\Delta\theta_n - \Delta\theta_{n-1})(\Delta\theta_{n-1} - \Delta\theta_{n-2})]$ is calculated by multiplying the value, obtained by subtracting the previous actual resolver position change $\Delta\theta_{n-1}$ from the actual resolver position change $\Delta\Theta_n$ at the inflection point by, the value obtained by subtracting the more previous actual resolver position change $\Delta\theta_{n-2}$ from the previous actual resolver position change $\Delta\theta_{n-1}$ and, at the same time, the value $[(\Delta\theta_n - \Delta\theta_0)(\Delta\theta_{n-1} - \Delta\theta_0)]$ is calculated by multiplying the value, obtained by subtracting the theoretical value of the resolver position change $\Delta\theta_0$ from the actual resolver position change $\Delta\theta_n$ at the inflection point, by the value obtained by subtracting the theoretical value of the resolver position change $\Delta\theta_0$ from the previous actual resolver position change $\Delta\theta_{n-1}$. Then, the two extracted values are compared with each other.

As a result, if all of the two values $[(\Delta\theta_n - \Delta\theta_{n-1})(\Delta\theta_{n-1} - \Delta\theta_{n-2})]$ and $[(\Delta\theta_n - \Delta\theta_0)(\Delta\theta_{n-1} - \Delta\theta_0)]$ are below zero (0) and substantially the same, the theoretical value of the resolver position θ calculated as above is stored as a reference output value $Y_N$ of a compensation table, and the current resolver position $\theta_n$ is stored as a reference input value $X_N$ of the compensation table (S106).

Subsequently, the base speed ($N_{base}$) is increased by increasing the integer N one by one (S105), and the theoretical value of the resolver position change at the increased base speed is reinitialized (S107) to repeat the sampling in the above manner. It is determined that one sampling period 1T is completed (S108) and, if so, the collection of the resolver position data and the construction of the compensation table at one sampling period 1T are completed.

Next, as shown in FIG. 4, it is determined whether to perform offset correction (i.e., whether to compensate nonlinearity) for the resolver in an actual hybrid or fuel cell vehicle (S109) and, if the offset correction is not completed, a process for compensating the nonlinearity of the resolver is performed in the following manner (S110).

In more detail, according to further exemplary embodiments, if the above values $[(\Delta\theta_n - \Delta\theta_{n-1})(\Delta\theta_{n-1} - \Delta\theta_{n-2})]$ and $[(\Delta\theta_n - \Delta\theta_0)(\Delta\theta_{n-1} - \Delta\theta_0)]$ are not below zero (0) and different from each other, the correction of the resolver position is performed by the following formula 4 for calculating a resolver position after the position correction (S110).

$$Y_o = \frac{(Y_N - Y_{N-1})}{(X_N - X_{N-1})} X_i + \frac{(Y_{N-1} X_N - Y_N X_{N-1})}{(X_N - X_{N-1})} \quad \text{[Formula 4]}$$

As such, when the reference input value $X_N$ stored in the compensation table as the current resolver position $\theta_n$, the reference output value $Y_N$ stored as the theoretical value of the resolver position θ, and the previously stored reference input value $X_{N-1}$ and reference output value $Y_{N-1}$ are substituted into formula 4, a resolver correction position $Y_0$ can be calculated.

That is, as can be seen from formula 4, the resolver correction position $Y_0$ is calculated by multiplying the value $$\frac{(Y_N - Y_{N-1})}{(X_N - X_{N-1})},$$

which is obtained by dividing the value $(Y_N - Y_{N-1})$, obtained by subtracting the previous reference output value $Y_{N-1}$ from the reference output value $Y_N$, by the value $(X_N - X_{N-1})$, obtained by subtracting the previous reference input value $X_{N-1}$ from the reference input value $X_N$, by a position angle $X_i$ before the resolver correction, and then by adding the value $$\frac{(Y_{N-1} X_N - Y_N X_{N-1})}{(X_N - X_{N-1})},$$

which is obtained by dividing the value $(Y_{N-1} X_N - Y_N X_{N-1})$, obtained by subtracting the value $(Y_N X_{N-1})$ obtained by multiplying the reference output value $Y_N$ by the previous reference input value $X_{N-1}$ from the value $(Y_{N-1} X_N)$ obtained by multiplying the previous reference output value $Y_{N-1}$ by the reference input value $X_N$, by the value $(X_N - X_{N-1})$, obtained by subtracting the previous reference input value $X_{N-1}$ from the reference input value $X_N$, thereto.

Accordingly, since the position angle error of the resolver due to the nonlinearity of the resolver can be linearly corrected, it is possible to stably control the motor current during high-torque and high-speed operation.

As described herein, the present invention, which outputs the position information of the resolver rotor to the RDC to extract the position information of the resolver rotor while the motor is driven at a suitably constant low speed and to calculate the theoretical value of the position change and, when the extracted angular velocity of the resolver at an inflection point and the calculated theoretical angular velocity are the same, stores them as an input and an output of a compensation table such that the nonlinearity of the resolver is linearly compensated by a compensation function of the compensation table, it is possible to stably control the motor current during high-torque and high-speed operation.

Accordingly, even when an error occurs in the position information of the motor rotor due to the nonlinearity of the resolver, it is possible to suitably ensure the stability of the control of the motor current by the inverter during maximum torque operation at low speed and to suitably ensure the stability of the control of the motor current during high-torque and high-speed operation by correcting the error.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for compensating nonlinearity of a resolver to control a motor in hybrid and fuel cell vehicles, the method comprising:
    collecting resolver position data by calculating an actual resolver position change $\Delta\theta_n$ during one sampling period 1T, by calculating a theoretical value of a resolver position $\theta$ obtained by adding a theoretical value of a resolver position change $\Delta\theta_0$ to the previous theoretical value of the resolver position $\theta_{old}$, and by extracting the actual resolver position change $\theta\Delta_n$ at an inflection point of nonlinear period and the theoretical value of the resolver position change $\Delta\theta_0$;
    determining whether to perform resolver position correction in the corresponding vehicle; and
    linearly compensating nonlinearity of the resolver based on the collected resolver position data, upon determining that the resolver position correction is not performed,
    wherein in the compensation of the nonlinear position of the resolver, a resolver correction position $Y_0$ is calculated by the following formula:

$$Y_o = \frac{(Y_N - Y_{N-1})}{(X_N - X_{N-1})} X_i + \frac{(Y_{N-1} X_N - Y_N X_{N-1})}{(X_N - X_{N-1})}$$

wherein $Y_N$ represents the reference output value of the compensation table, $Y_{N-1}$ represents the previous reference output value, $X_N$ represents the reference input value of the compensation table, $X_{N-1}$ represents the previous reference input value, and $X_i$ represents the position angle before the resolver correction.

2. The method of claim 1, wherein the collection of the resolver position data is performed while the motor is driven at a constant low speed.

3. The method of claim 1, wherein collection of the resolver position data comprises:
    extracting values $[(\Delta\theta_n-\Delta\theta_{n-1})(\Delta\theta_{n-1}-\Delta\theta_{n-2})]$ and $[(\Delta\theta_n-\Delta\theta_0)(\Delta\theta_{n-1}-\Delta\theta_0)]$ and comparing the values; and
    storing the calculated theoretical value of the resolver position $\theta$ as a reference output value $Y_N$ of a compensation table and storing the current resolver position $\theta_n$ as a reference input value $X_N$ of the compensation table, if all of the two values $[(\Delta\theta_n-\Delta\theta_{n-1})(\Delta\theta_{n-1}-\Delta\theta_{n-2})]$ and $[(\Delta\theta_n-\Delta\theta_0)(\Delta\theta_{n-1}-\Delta\theta_0)]$ are below zero (0) and substantially the same,
    wherein $\Delta\theta_n$ represents the actual resolver position change, $\Delta\theta_{n-1}$ represents the previous actual resolver position change, $\Delta\theta_{n-2}$ represents the more previous actual resolver position change, and $\Delta\theta_0$ represents the theoretical value of the resolver position change.

4. The method of claim 3, further comprising compensating nonlinear position of the resolver, if the values $[(\Delta\theta_n-\Delta\theta_{n-1})(\Delta\theta_{n-1}-\Delta\theta_{n-2})]$ and $[(\Delta\theta_n-\Delta\theta_0)(\Delta\theta_{n-1}-\Delta\theta_0)]$ are not below zero (0) and different from each other.

* * * * *